United States Patent [19]

Karlisch et al.

[11] Patent Number: 5,212,369
[45] Date of Patent: May 18, 1993

[54] METHOD OF LOADING APPLICATIONS PROGRAMS INTO A MEMORY CARD READER HAVING A MICROPROCESSOR, AND A SYSTEM FOR IMPLEMENTING THE METHOD

[75] Inventors: Thierry Karlisch, Aubagne; Jean-Yves Le Roux, Bouc Bel Air, both of France

[73] Assignee: Gemplus Card International, Gemenos, France

[21] Appl. No.: 644,989

[22] Filed: Jan. 23, 1991

[30] Foreign Application Priority Data

Jan. 25, 1990 [FR] France ................. 90 00868

[51] Int. Cl.⁵ ............................ G06F 15/30
[52] U.S. Cl. ................... 235/380; 235/379; 235/492
[58] Field of Search ........... 235/380, 382, 487, 492; 364/408

[56] References Cited

U.S. PATENT DOCUMENTS

| | | | |
|---|---|---|---|
| 4,544,833 | 10/1985 | Ugon | 235/379 |
| 4,590,365 | 5/1986 | Kada | 235/379 |
| 4,683,553 | 7/1987 | Mollier | 235/376 |
| 4,767,920 | 8/1988 | Kitta et al. | 235/492 |
| 4,928,001 | 5/1990 | Masada | 235/380 |
| 4,960,982 | 10/1990 | Takahira | 235/380 |
| 5,036,461 | 7/1991 | Elliot et al. | 235/380 |

FOREIGN PATENT DOCUMENTS

| | | |
|---|---|---|
| 0089876 | 3/1983 | European Pat. Off. . |
| 0096599 | 4/1983 | European Pat. Off. . |
| 0134109 | 7/1984 | European Pat. Off. . |
| 0202622 | 5/1986 | European Pat. Off. . |

OTHER PUBLICATIONS

PTR Phillips Telecommunication, vol. 45, No. 2, Jun. 1987.

*Primary Examiner*—Harold Pitts
*Attorney, Agent, or Firm*—Roland Plottel

[57] ABSTRACT

The method of loading applications programs into a memory card reader having a microprocessor, connected by telephone to a server center, and suitable for executing these applications is such that the applications programs are stored in the memories of cards entitled to said applications while corresponding application pointers are stored in the server center, with the method consisting, once a card has been inserted in the reader, in setting up a telephone call from the reader to the server, in transferring the pointer for the application requested by the reader over the telephone line, in the reader interpreting the pointer to find the corresponding application program in the card, and then in transferring the program very quickly to the reader for the purpose of executing it. The invention applies in particular to those applications programs which are run most frequently from a memory card.

3 Claims, 2 Drawing Sheets

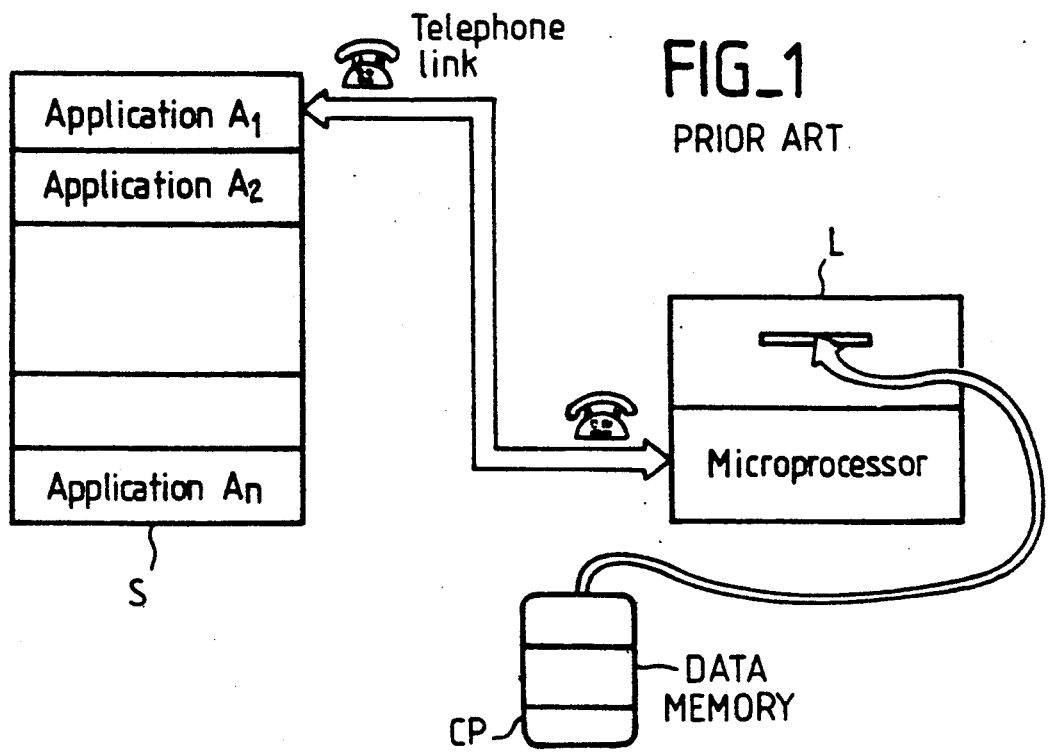
FIG_1
PRIOR ART
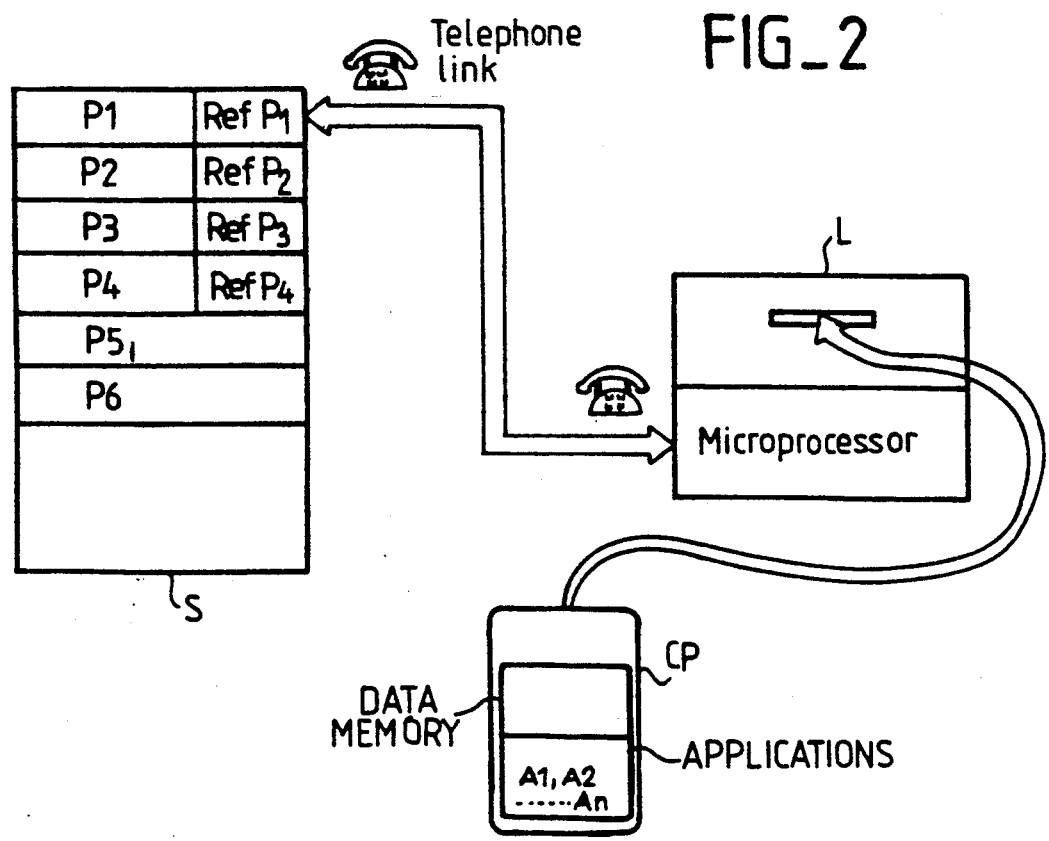
FIG_2

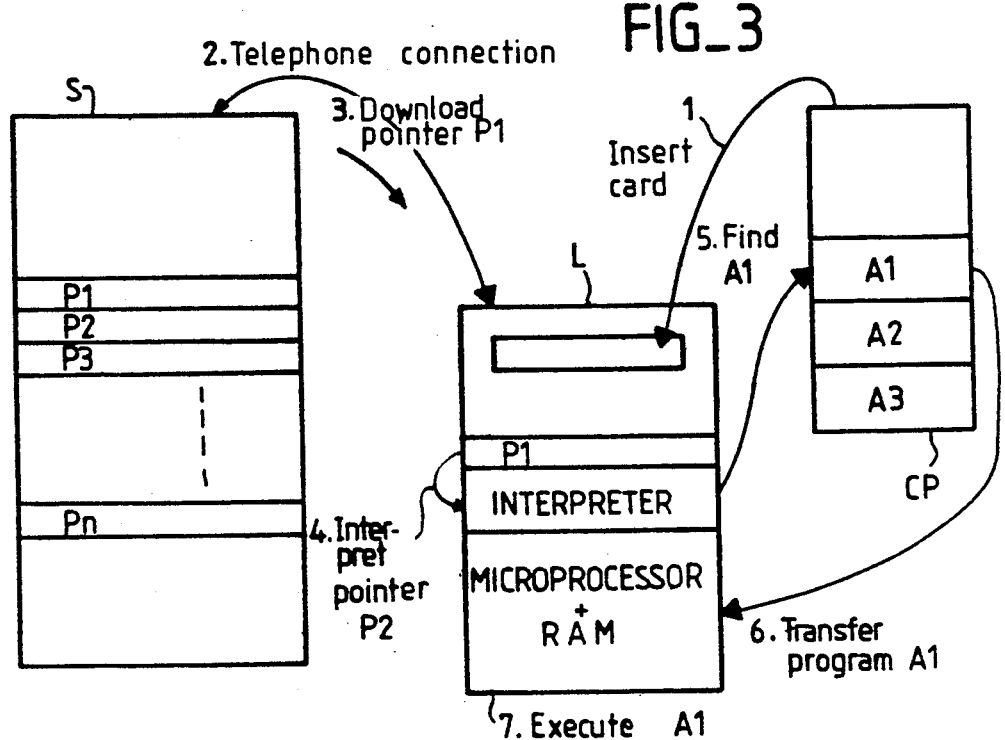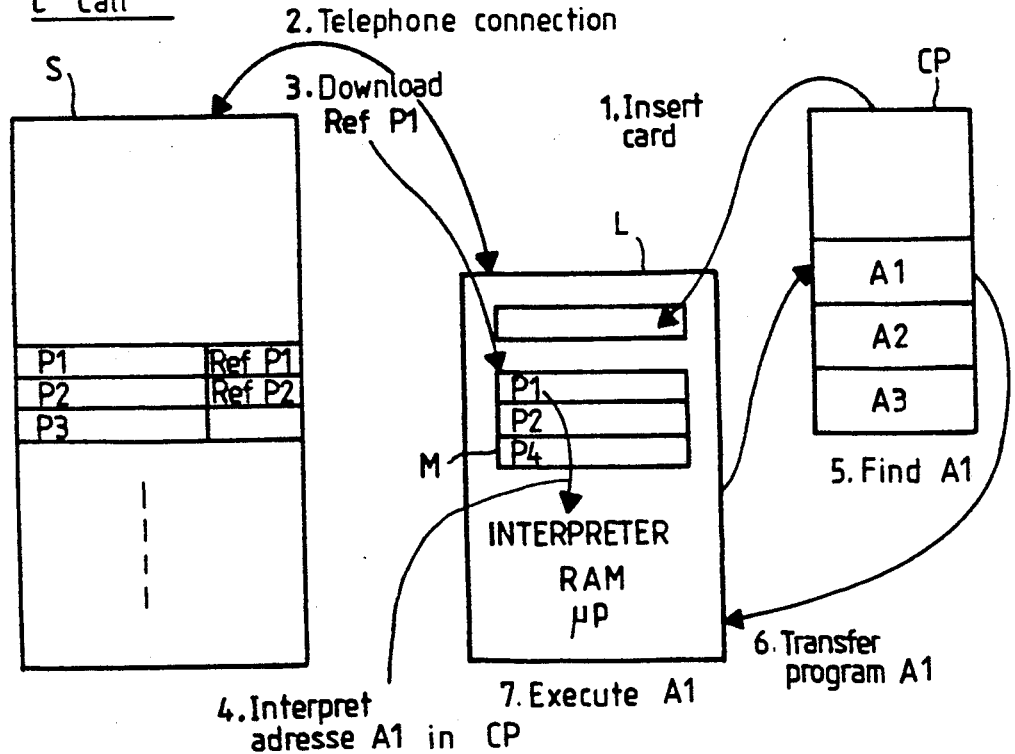

METHOD OF LOADING APPLICATIONS PROGRAMS INTO A MEMORY CARD READER HAVING A MICROPROCESSOR, AND A SYSTEM FOR IMPLEMENTING THE METHOD

The invention relates to methods and systems using memory cards ("smart cards") carried by users, and used with readers having microprocessors and connected by telephone to a server center.

BACKGROUND OF THE INVENTION

Such systems can be used, for example, in applications relating to customer account management: customers have their own specific sets of data, for example comprising an identity in code form, an upper limit on purchases, a code specifying a type of customer type, etc. . . . Such data specific to one customer is conventionally stored in a memory card.

The card reader includes a microprocessor for performing the operation or the sequence of operations requested in the context of an application, e.g. verifying customer identity or that an order has gone through, etc., . . . both on the basis of data in the memory of the customer's card as read by the reader where necessary, and also on the basis of an application program corresponding to the requested utilization. Such a system is for example described in the Philips TDS review Vol 45, No. 2, June 1987.

Applications programs are conventionally stored in a central server and are transferred by downloading into the random access memory (RAM) of the microprocessor when required for the requested utilization, with downloading taking place via the telephone line that connects the card reader to the server.

As shown in FIG. 1 which relates to a conventional system, the server S includes all applications programs A1, A2, . . . An stored in memory. The server is connected to down loading card readers such as L by the telephone network. A reader includes a reader portion proper for reading memory cards and a microprocessor portion for running an application. Such a prior art system operates as follows:

the "smart" card CP is inserted in the reader L;
the reader L then connects itself to the server S;
the server then downloads the application program requested by the reader; and
once the application has been downloaded, the reader executes it.

A major drawback of such a system is the slowness of the procedure of downloading the application into the reader due to the transmission means used: a telephone line is a low data rate transmission medium (75 bauds). In addition, a large amount of memory is required in the server to store all of the applications programs.

An object of the invention is to provide a method of loading applications programs into a memory card reader having a microprocessor, the method enabling the above drawbacks to be remedied, with an application program loading much more quickly and the memory size required in the server being smaller than in conventional systems. This is achieved by prior storage of applications programs in memory cards entitled to the applications.

SUMMARY OF THE INVENTION

The present invention provides a method of loading applications programs into a memory card reader, the reader including a microprocessor and being connected by telephone to a server center, the method consisting:

during a preparatory stage in storing applications programs in the memories of memory cards entitled to said applications, and in storing pointers associated with each of these programs in the server controlling said applications, said pointers being suitable for interpretation by the readers to find the corresponding applications programs in a card and to transfer them into the RAM of the reader; and during a utilization stage, after a card has been inserted in the reader, in setting up a telephone call to the server, in transferring the required application pointer from the server to the reader via the telephone line, causing the reader to interpret the pointer, thereby controlling interrogation of the card, and in transferring the application program into the RAM of the reader for the purpose of executing it.

The invention also provides a system for implementing the method.

BRIEF DESCRIPTION OF THE DRAWINGS

An embodiment of the invention is described by way of example with reference to the accompanying drawings, in which:

FIG. 1 is a diagram of the above-described prior art memory card and downloading reader system;

FIG. 2 is a diagram of a memory card and downloading reader system of the invention;

FIG. 3 shows a first variant of the method of the invention enabling applications programs to be loaded quickly; and FIG. 4 shows a second variant of the method of the invention.

DETAILED DESCRIPTION

In the invention, the server continues to oversee all of the applications under its control, but the corresponding applications programs are not stored in full in the server as in the past. At least the most frequently used applications are stored in the memory cards entitled to them, and they can be read from the memory cards by means of associated application pointers. These application pointers are commands transmitted to the reader, which the reader interprets to find the applications programs stored in the card.

These application pointers are transmitted by the server to! the reader via the telephone links, or if the reader has a zone of non-volatile memory, the server may request the reader to store a transmitted application pointer on the first occasion that they are interconnected such that during subsequent occasions on- which they are interconnected, only a reference to the pointer need be transmitted over the telephone network.

The system of the invention shown in FIG. 2 is thus as follows: the server S no longer contains applications programs A1, A2, . . . An as shown in FIG. 1, but only application pointers, optionally together with references to these application pointers, e.g. P1 and ref P1 corresponding to an application A1, P2 and ref P2 corresponding to an application A2, etc. . . . P5 corresponding to A5, P6 corresponding to A6, etc.

The server is connected to readers such as L by the telephone network. A reader is capable of reading a memory card CP whose memory includes not only data specific to the card holder, as before, but also the applications programs that may be executed in associated with the card, or at least those programs that are used the most frequently.

The method of loading applications programs quickly into the reader having a microprocessor capable of executing them is then as follows, as illustrated in FIG. 3:

Step 1. The memory card CP is inserted in the reader L.

Step 2. The reader then connects itself to the server.

Step 3. An application pointer is downloaded from the server to the reader, e.g. pointer P1 corresponding to a program A1 for verifying the identity of the card holder.

Step 4. The application pointer which constitutes a command is then interpreted by the reader L and may correspond, for example, to an instruction to read a particular portion of the memory in the memory card.

Step 5. The reader finds the corresponding application program A1 stored in the card.

Step 6. The application program A1 contained in this portion of the card memory is then transferred from the card to the reader, and this transfer takes place quickly.

Step 7. The reader then executes the application.

If the reader also includes a small capacity zone (e.g. 8 Kbytes) of non-volatile memory M, the cost of the reader is not significantly increased and the loading method may be further accelerated by causing the server to store reference codes in association with its application pointers such as P1, P2, . . .

The first time a reader is connected to the server, the required application program pointer is transferred and stored permanently in the non-volatile memory zone M of the reader in which it can subsequently be found by means of the reference code.

As shown in FIG. 4, when the same reader is subsequently connected to the server and requests the same applications, the corresponding application pointer is no longer transmitted: only its reference is transmitted over the telephone line, thereby enabling the reader to locate the pointer in its own memory. Thereafter, as in the first variant, the pointer is interpreted to locate the memory zone in the card which contains the corresponding application program, which program is then loaded into the RAM of the microprocessor in the reader for the purpose of being executed.

If the reader can be connected to one or more servers via the telephone network, then the pointers stored in the non-volatile memory of the reader may come from different server centers, e.g. P4 in FIG. 4.

Naturally these two variants are not mutually exclusive and they may both be implemented simultaneously in the same system. For example, in FIG. 4, pointer P3 which has not been stored in the reader will need to be downloaded into the reader should the corresponding application A3 be required.

The method of loading applications programs quickly may also coexist with the conventional method of downloading entire programs from the server to the reader as may be necessary for applications that are used less often or for new applications that have not yet been stored in the cards, in which case the system then suffers in respect of these applications from the drawback of long downloading time as in prior art systems.

We claim:

1. A method for loading an application program into a memory card reader, said application program comprising coded instructions for executing actions; said memory car reader including a microprocessor, a RAM memory for receiving said application program; and said memory card reader being connected by a telephone line to a server center; said server center controlling said application program, the method comprising the steps of:
    (a)—during a preparatory stage,
        (i)—at least said application program is stored in a memory of a memory card which is adapted to be inserted in said memory card reader,
        (ii)—at least one pointer associated with said application program is stored in said server center, and
    (b)—during a utilization stage, at a later time and when said memory card has been inserted in said memory card reader,
        (i)—a telephone connection is established between said memory card reader and said server center,
        (ii)—said pointer associated with said particular application is then transferred from the server center to the memory card reader via the telephone line,
        (iii)—said memory card reader interprets said transferred pointer to find said corresponding application program in said memory card, said memory card reader thereby controls an interrogation of the memory card, and
        (iv)—said memory card reader transfer said application program from said memory of said memory card into said RAM memory of said memory card reader for the purpose of executing said actions.

2. A method according to claim 1, wherein during said preparatory stage,
    reference codes associated with the application pointers are stored int he server center, and
    wherein said utilization stage comprises a first and subsequent stages during said first utilization stage,
    on request of the server center, the pointers are stored in a non-volatile memory of the reader on the occasion of a first transfer to said memory card reader,
    said pointers being found in the memory card reader by means of their reference codes, and
    during said subsequent utilizations of the same application by the same reader,
    only a reference code for a corresponding application pointer is transferred from the server center to the memory card reader over the telephone line,
    said reference code designating the memory zone of the memory card reader containing said corresponding application pointer that is to be interpreted by the memory card reader to control the loading of the application program from the memory of said memory card into the RAM of the memory card reader for the purpose of executing said actions.

3. A method according to claim 2, wherein in addition to containing pointers associated with applications programs stored in the memory cards and reference codes associated with said pointers, the server further includes applications programs that are not stored in the memory of the memory cards and which are transferred to the reader via the telephone line whenever necessary.

* * * * *